United States Patent

[11] 3,582,092

[72] Inventors Franklyn J. Amorese
 Hilton;
 Edward S. Harrison, Pittsford, both of, N.Y.
[21] Appl. No. 847,301
[22] Filed Aug. 4, 1969
[45] Patented June 1, 1971
[73] Assignee Sybron Corporation
 Rochester, N.Y.

[54] NONMETALLIC PACKAGE SEAL ASSEMBLY
 4 Claims, 1 Drawing Fig.
[52] U.S. Cl. ............................................. 277/87, 23/252, 277/63
[51] Int. Cl. ....................................................... F16j 15/16
[50] Field of Search ........................................ 277/65, 87, 96, 63, 227, 81; 23/252 A

[56] References Cited
 UNITED STATES PATENTS
 2,843,403 7/1958 Stevenson .................. 277/96
 2,931,631 4/1960 Harrison ..................... 277/87X
 3,420,535 1/1969 Hershey ...................... 277/91
 3,484,113 12/1969 Moore ........................ 277/65X

OTHER REFERENCES

"Glascote Chemical Equipment" Copyrighted 1923 by The Glascote Co., Euclid (Cleveland District), Ohio, pages 4 to 10 incl. relied upon 23-252(A)

"Materials of Construction", Chemical Engineering, Nov., 1956, pages 175 to 179 relied upon 23-252(A)

Primary Examiner—Laverne D. Geiger
Assistant Examiner—Robert I. Smith
Attorney—Theodore B. Roessel ABSTRACT: Disclosed is a package rotary seal assembly for use in corrosive atmospheres wherein the end of sleeve portion of the seal assembly exposed to the corrosive atmosphere is glass coated and is provided with a ceramic insert which forms a seat for containing the means to seal the sleeve against the rotating shaft.

PATENTED JUN 1 1971
3,582,092
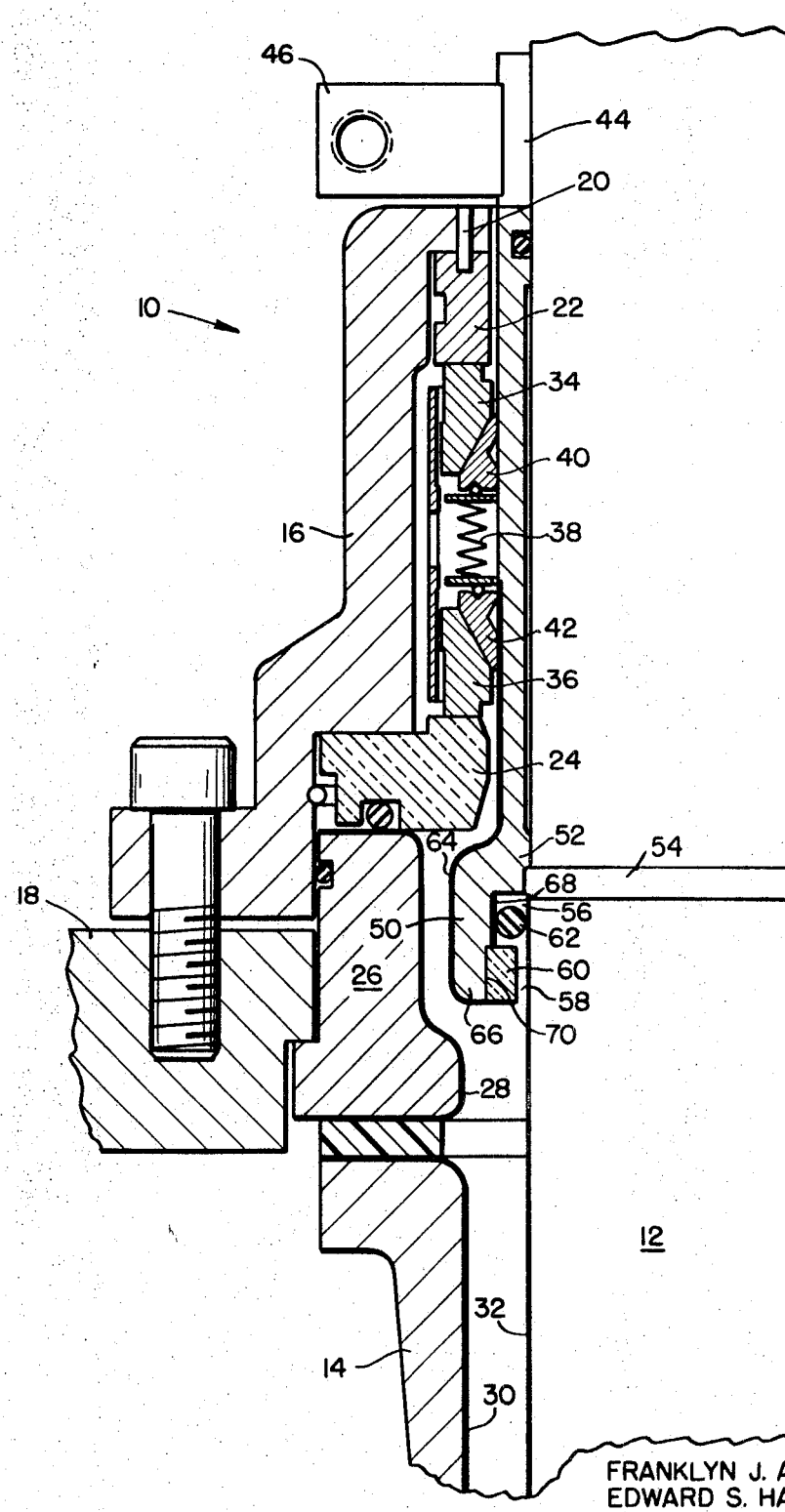
INVENTORS
FRANKLYN J. AMORESE
EDWARD S. HARRISON
BY *Theodore B Roesel*
ATTORNEY

NONMETALLIC PACKAGE SEAL ASSEMBLY

BACKGROUND OF THE INVENTION

The present invention relates generally to package rotary seal assemblies and, more specifically, to such a seal assembly adapted for use in corrosive environments wherein all surfaces of the seal assembly exposed to the environment are nonmetallic.

U.S. Pat. No. 2,931,631 is illustrative of rotary seal assemblies commonly used with equipment employed by the chemical industry. These seal assemblies are used to seal between a vessel wall and a rotating shaft which extends into the vessel. In cases where the contents of the vessel are corrosive, the vessel and shaft are glass coated and the stationary member of the seal which bears against the rotating shaft is made from a noncorrosive material such as a polytetrafloroethylene. The glass coating on the shaft extends to a point beyond this sealing member so that the noncoated portion of the shaft is isolated by the sealing member from the corrosive environment.

Package seal assemblies are distinguished from the seal assemblies as shown in U.S. Pat. No. 2,931,631 in that package seals contain an additional member known in the art as a "sleeve" which is fixed to and rotates with the shaft. This sleeve is the part of the seal assembly which permits the package seal to be assembled and replaced as a unit whereas seals shown in the above mentioned patent cannot be replaced as a unit. In prior art package rotary seal assemblies, this sleeve was made from an exotic metal such as the hastelloys, nickels or stainless steels to withstand corrosion attack because the configuration of the sleeve of the prior art made it impossible to glass coat the sleeve. In this respect, the close tolerance between the sleeve and the shaft requires that the edge of the sleeve adjacent the shaft be relatively square and glass coatings cannot be applied to articles which have sharp edges and corners.

SUMMARY OF THE INVENTION

The rotary package seal assembly of the present invention contains a sleeve which overcomes a drawback of the prior art by having the lower end of the sleeve enlarged to increase the wall thickness for glassing. The surfaces of the enlarged end are provided with smooth curves and radii to facilitate the glass coating of the exterior and interior of the enlarged sleeve end. The clearance between the enlarged end and the shaft is reduced and the sharp edge between the sleeve and the shaft provided by a ceramic insert fixed to the inner periphery of the enlarged sleeve portion. The ceramic together with the enlarged sleeve end also forms a seat for conventional sealing means such as a Telflon O-ring which seals the annular interstice between the ceramic insert and the shaft.

OBJECTS OF THE INVENTION

It is an object of the present invention to provide a rotary package seal assembly for use in corrosive environments in which the sleeve of the package seal assembly is coated with a corrosion-resisting nonmetallic coating to protect the sleeve against attack by the environment.

Another object of the present invention is to provide a low-cost rotary package seal assembly for use in corrosive environments wherein the sleeve portion is made from mild steel.

These and other objects, advantages and characterizing features of the present invention will become more apparent upon consideration of the following detailed description thereof when taken in conjunction with the accompanying drawings depicting the same.

DESCRIPTION OF THE DRAWINGS

The sole FIGURE is a view in section of a package rotary seal assembly having the sleeve of the present invention.

DESCRIPTION OF THE PREFERRED EMBODIMENTS

Referring to the drawing, the figure shows the package rotary seal assembly of the present invention generally indicated at 10 for rotatably sealing a shaft 12 which extends into the neck 14 of a vessel (not shown). The package rotary sealing assembly includes a housing member 16 which is fixed to a support member 18 which in turn is fixed to the vessel by any suitable means (not shown). Fixed to the upper end of the housing by a pin 20 is a stationary outboard seal seat 22.

Adjacent the lower end of the housing is stationary inboard seal seat 24 which is held against an inboard seal seat retainer 26 by the housing. Since inboard stationary seal seat 24 is exposed to the corrosive environment within the vessel, it is preferably made from a nonmetallic material such as ceramic. Inboard stationary seat retainer 26, which is also exposed to the corrosive environment, is preferably made of a mild steel with the surfaces of the retainer exposed to the corrosive environment of the tank being provided with a corrosion-resisting glass coating 28. In like respect, the neck 14 of the vessel and the surface of shaft 12 is provided with a corrosion-resisting glass coating 30 and 32 respectively.

Completing the outboard and inboard seals are rotating seal members 34 and 36. Both rotating seal members 34 and 36 are preferably made of carbon and are urged into rotary fluidtight sealing engagement with the outboard stationary seal seat 22 and the inboard ceramic seal seat 24 by conventional means such as spring 38 and wedge members 40 and 42.

The rotating seal members and the wedge members are rotated by a sleeve 44 which is attached to shaft 12 by any suitable means such as a clamp 46. As shown in the figure, an important feature of the present invention is that the lower end 50 of sleeve 44 has an enlarged diameter for purposes set out hereinbelow. A portion 52, of the enlarged end may be formed as a shoulder which seats against a stop 54 on the shaft for purposes of locating the sleeve on the shaft. The inner periphery of enlarged sleeve portion 50, together with shaft 12 defines an annular space 56 about the shaft.

The enlarged diameter of sleeve end 50 allows for the insertion of an annular ceramic member 60 into the annular space 56 between the shaft and the bonding of the ceramic insert to the inner periphery of the enlarged sleeve end. This ceramic insert forms a flange which extends radially inward to substantially narrow the opening of annular space 56 to a small interstice indicated at 58. Further, the disposition of ceramic insert 60 at the opening of annular space 56 together with shoulder 52 and the inner periphery of the enlarged sleeve end forms a seat behind the insert for any suitable sealing means such as an encapsulated O-ring 62 which seals between enlarged sleeve portion 50 and shaft 12.

Since sleeve end 50 is enlarged, the outer periphery of this end can be made with smooth or rounded corners to permit glass coating of the outer periphery. Accordingly, a glass coating 64 is provided on the enlarged sleeve end which extends over the outer periphery of the sleeve including the lowermost end 66 of the sleeve and the ceramic insert. This protects both the sleeve and the bond between the ceramic insert and the sleeve against corrosive attack. The inner periphery of lower sleeve portion 50 is also provided with a glass coating as indicated at 68 which extends from the ceramic insert to a point on the other side of seal member 62 to protect the inner periphery of lower portion 50 from attack by the corrosive environment.

In manufacture, the lowermost end 66 of the sleeve is rounded so that the glass coating indicated at 64 and 68 is continuous. A seat indicated at 70 is then machined in the lowermost end and the ceramic insert 60 bonded in the seat. A glass coating is then reapplied to the lowermost end of the sleeve and across the ceramic insert to insure protection of the joint between the sleeve and ceramic insert.

Accordingly, all the surfaces of the package rotary seal exposed to the corrosive environment are either nonmetallic or contain a corrosion-resistant coating. The sleeve member of the present invention, which in prior art package seals adapted for use in corrosive environments was made of an exotic metal, can be made of a more common metal such as mild steel and glass coated to protect the seal from corrosive attack. The use of a ceramic insert 60 adjacent the lower portion of the sleeve eliminates the necessity of attempting to glass coat a sharp corner. In this respect, the ceramic insert itself provides the sharp edge adjacent shaft 12 to reduce the clearance between the sleeve and the shaft. The glass coating which extends across the joint between the insert and the sleeve protects the joint from corrosive attack.

Thus, it will be appreciated that the present invention accomplishes it intended objects providing a rotary package seal assembly wherein the sleeve portion exposed to the corrosive environment can be provided with a corrosion-resisting nonmetallic coating. While we have described in invention with respect to package seal assemblies wherein the inboard and outboard seals are stacked one on top of another, it should be appreciated that a sleeve according to the present invention can also be used with package seal assemblies wherein the inboard and outboard seals are concentric with one being located within another. Such a package seal assembly is described, for example, in a copending application, Ser. No. 815,606, filed Apr. 14, 1969.

Also, while it may be possible to eliminate the ceramic insert and instead provide the lowermost end 66 with a flange, generally L-shaped in cross section, extending radially inward toward the shaft, such a structure is not preferred as the flange would have to be rounded in order to accept a glass coat and a rounded surface connecting the flange to the inner periphery of the enlarged end would reduce the effectiveness of the O-ring seal 62 between the sleeve and the shaft.

Having thus described the invention, what We claim as new is:

1. In a package seal assembly for rotatably sealing a shaft extending through a passage in a vessel wall, including a sleeve member adapted to slidably receive said shaft and to corotate with said shaft, rotating seal means carried by said sleeve, stationary seal means carried by said vessel about said passage, and means for urging said rotating and stationary seal means into fluidtight rotary sealing engagement, the improvement comprising:
    a. said sleeve having one enlarged end which together with said shaft forms an annular space therebetween opening axially from said sleeve;
    b. a ceramic insert bonded to said enlarged sleeve end which extends radially inwardly towards said shaft so as to substantially close the opening of said annular space, said insert together with the inner periphery of said enlarged sleeve and forming a seal seat;
    c. seal means in said seat for sealing between said shaft and the inner periphery of said enlarged sleeve end; and
    d. a corrosion-resistant coating on the outer peripheral surface of said sleeve extending over said enlarged sleeve end and said ceramic insert and along the internal peripheral surface of said enlarged sleeve end.

2. A package seal assembly as set forth in claim 1 in which said corrosion-resistant coating extends across the lowermost end of said sleeve and said ceramic insert to protect the bond between said sleeve and insert from corrosive attack.

3. In a package seal assembly for rotatably sealing a shaft extending through a passage in a vessel wall, including a sleeve member adapted to slidably receive said shaft and to corotate with said shaft, said sleeve having an end exposed to the interior of said vessel, rotating seal means carried by said sleeve, stationary seal means carried by said vessel about said passage, and means for urging said rotating and stationary seal means into fluidtight rotary sealing engagement, the improvement comprising:
    a. said sleeve having its end exposed to said vessel enlarged wherein the inside diameter of said enlarged end and the outside diameter of said shaft forms an annular space therebetween;
    b. a flange on said enlarged sleeve end extending radially inwardly towards said shaft, said flange together with the inner periphery of said enlarged sleeve end forming a seal seat within said enlarged end;
    c. seal means in said seat for sealing between said shaft and the inner periphery of said enlarged sleeve end;
    d. an internal shoulder on said sleeve engaging a corresponding stop on said shaft for positioning said sleeve on said shaft, said shoulder and stop being located on the far side of said seal means from said vessel whereby said seal means seals said shoulder and stop from the interior of said vessel;
    e. The outer periphery of said enlarged sleeve end being joined to said sleeve in a smooth radius and the vessel exposed edge of said sleeve being rounded; and
    f. a corrosion-resistant glass coating provided on said sleeve extending along the outer periphery thereof from a point beyond said rotating seal means over said enlarged sleeve end and said flange and along the eternal peripheral surface of said enlarged sleeve end to a point beyond said seal means.

4. A package seal assembly as set forth in claim 3 wherein said flange comprises a ceramic insert bonded to the inner periphery of said enlarged sleeve end.